Dec. 20, 1966 M. FIEHL 3,293,415

DATA PROCESSING INPUT APPARATUS

Filed Dec. 3, 1962 2 Sheets-Sheet 1

INVENTOR
MICHAEL FIEHL
BY Paul M. Brown
AGENT

United States Patent Office 3,293,415

Patented Dec. 20, 1966

3,293,415

DATA PROCESSING INPUT APPARATUS

Michael Fiehl, East Vestal, N.Y., assignor to International Business Machines Corporation, New York, N.Y., a corporation of New York Filed Dec. 3, 1962, Ser. No. 241,912
6 Claims. (Cl. 235—61.11)

This invention relates to data processing input apparatus and, particularly, to an improved arrangement for providing high-speed serial entry of information recorded in punched cards or tapes. It is well known in the data processing field that it is advantageous in many instances to enter data serially by column from punched cards and the like, whereas the feeding problems and document handling problems are relieved if the cards are fed in parallel fashion.

Previous arrangements proposed to provide parallel feeding of cards or documents but serial readout therefrom have either required large amounts of external buffer storage apparatus to store the parallel read information until it can be transferred serially to the data processing system, or in systems in which the information on the card is read simultaneously, the card must be effectively stopped in its path in order to permit simultaneous readout of all information. The present invention provides an improvement over the arrangement shown in the prior art in that it permits serial readout of a parallel fed card without the necessity of stopping the card at any portion during its travel. In accordance with the invention, each card is fed in parallel (long edge first) using a conventional card feed mechanism. As the card progresses through the card feed mechanism, it is passed by a sensing station at which point radiant energy is transmitted via the holes in the card to a series of photoresponsive strips, one for each of the possible rows of hole locations on the card; for example, in the ordinary type of record card, 12 photosensitive strips are provided in accordance with 12 possible rows of punchings in the card. To determine the columnar position of holes which are punched in any given row, a movable mask, such as a series of perforations on an endless tape, is passed between the record card and the photosensitive strips. By suitable timing means associated with the movable mask or endless belt, information read out as a result of the energization of a photosensitive strip by radiant energy transmitted through a punched hole is coordinated in readout so that the columnar position of data read from any particular row is realized. In order to accommodate the motion of the card, the photosensitive strips and the direction of travel of the mask are skewed with respect to the direction of motion of the record card, the angle of skew being directly dependent upon the relative speeds of the card and of the movable mask or endless belt.

Accordingly, an object of this invention is to provide a high-speed parallel-to-serial card or document reading data processing input apparatus.

A more particular object of this invention is to provide a data processing input aparatus for providing parallel-to-serial card or document reading, in which the documents need not be stopped during the reading operation.

A further object of the invention is to provide an arrangement of the type described in which the sensing portions of the document reading apparatus are skewed with respect to the direction of motion of the documents at such an angle that the cards can be effectively read while the document remains in motion.

The foregoing and other objects, features and advantages of the invention will be apparent from the following more particular description of a preferred embodiment of the invention as illustrated in the accompanying drawings.

In the drawings.

Similar reference characters in each of the various views designate similar parts.

Figure 1:
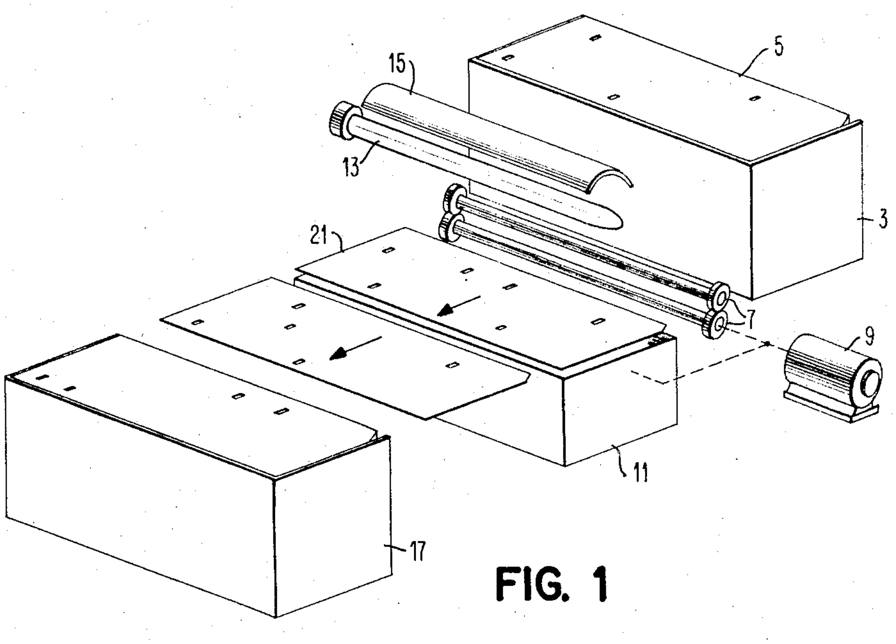
FIG. 1 is a diagrammatic view showing a card feeding apparatus together with a card reading station embodying the invention, which schematically illustrates the general arrangement of the parts.

Referring to FIG. 1 of the drawings, there is shown a card feed hopper 3 of ordinary construction which is adapted to feed punched record cards of a well-known variety 5, one at a time, the direction of travel of the cards being parallel to the short dimension of the cards. Such feeding and transporting of document cards is known as parallel feeding. The cards are moved along a card path in the direction indicated generally by the arrows, by transport apparatus, which may include, for example, feed rolls such as the rolls 7 shown, driven by suitable connections from a power source such as the motor 9. Additional transport apparatus, not shown, but the type of which is well known in the document handling art, will transport the cards past a reading station 11, the reading station having associated therewith a lamp 13 and reflector 15, from whence the record cards are supplied to a stacker or hopper 17. The prime object of the present invention is to provide an arrangement for reading each of the record cards, such as the card 21, when it is in motion over the reading apparatus 11. The information read from the card is supplied in serial fashion; that is, one column at a time successively, starting, say, from the first designated column on the card and reading out successively to the last column. In business cards of the ordinary variety, having 80 columns, the columns may, for example, be read in the order from column 1 through column 80.

Figure 2:
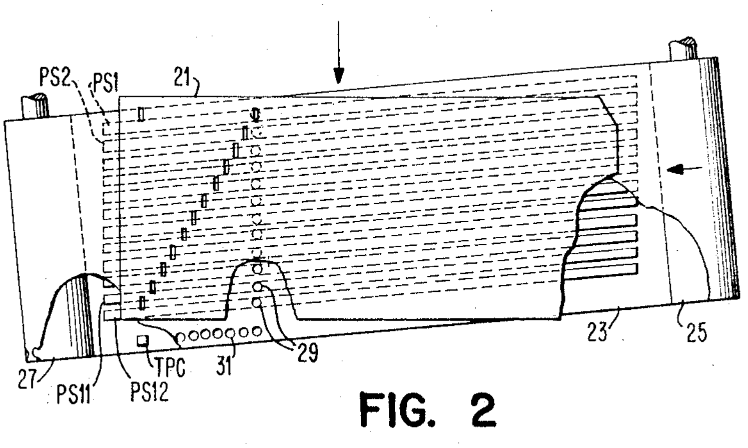
FIG. 2 is a diagrammatic plan view of a document passing through the reading station showing the relationship between the document, the photosensitive strips which detect the holes in the document, and the movable mask comprising the endless belt which determines the columnar position to be read.

As can be seen from FIG. 1, when the card 21 is positioned over the reading station 11, the card will be illuminated by light or other radiant energy supplied from a suitable source such as the lamp 13, which is concentrated and reflected also by the reflector 15 so that the entire card is illuminated and radiant energy will pass through those holes in the card which have been punched. The apparatus for detecting the punched holes in the various rows and columns of the card and for reading this information out in column-by-column fashion is illustrated more in detail in FIG. 2. Referring to FIG. 2, the reference character 23 designates an endless tape or belt. This tape or belt passes over a pair of rollers 25 and 27, which are arranged to be driven in synchronism with the card feeding mechanism, but at a different rate of speed as will be subsequently explained. The tape or belt 23 carries thereon a row of perforations such as those indicated by reference character 29, for the purpose of sensing the punched holes in the cards in a manner to be subsequently described. Moreover, the tape contains a series of holes 31 along the edge of the tape which are used for timing purposes. Disposed beneath the tape is a plurality of photosensitive strips, one for each row in the documents to be read, such as the strips PS1, PS2, . . . PS11 and PS12, these indicating the first two and the last two, respectively, of twelve photosensitive strips as shown. The photosensitive strips and the endless belt 23 are arranged at an angle to the direction of card motion, the degree of angularity being determined by the relative speed of the cards past the sensing station and the velocity of travel of the belt. The parts are proportioned and arranged so that, when the card is in position for the first one of the columns to be read, the row of sensing holes 29 will start sweeping across the photosensitive strips at the leading edge of the card, and will have completed their transit of the photosensitive strips by the time any holes in the last column of the card in the same row have come into alignment with the photosensitive strip. Thus, the skew of the belt and the photosensitive strips compensates for the continuing motion of the card as it passes the sensing station. An auxiliary photosensitive device designated as TPC is provided along the edge of the belt and is arranged so that, as the timing holes 31 pass, a series of pulses is emitted which corresponds to the various column locations in the card, for the purposes of activating readout switching circuits to be subsequently described.

Figure 3:
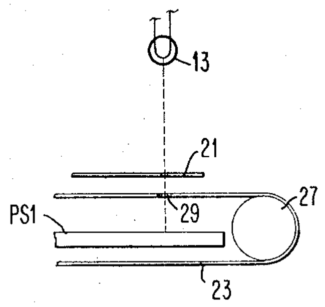
FIG. 3 is a sectional view showing the relation between the light source, the document, the movable mask and the photosensitive strips.

In FIG. 3, there is shown a diagrammatic view of a cross-section relationship of the various parts. It can be seen that the radiant energy or light source 13 is arranged to supply radiant energy through a hole in the card 21 which also passes through one of the sensing perforations 29 in the belt and impinges on the surface of one of the photosensitive elements such as PS1.

As previously pointed out, the mechanical connections between the rollers 25 and 27 and the driving source 9, as well as the card feed rollers 7, are proportioned and arranged so that the speed of the sensing holes in the endless tape or belt is adequate to sweep from one end of the card to another through all columnar positions during the time that the card moves through the sensing station a commensurate distance.

Figure 4:
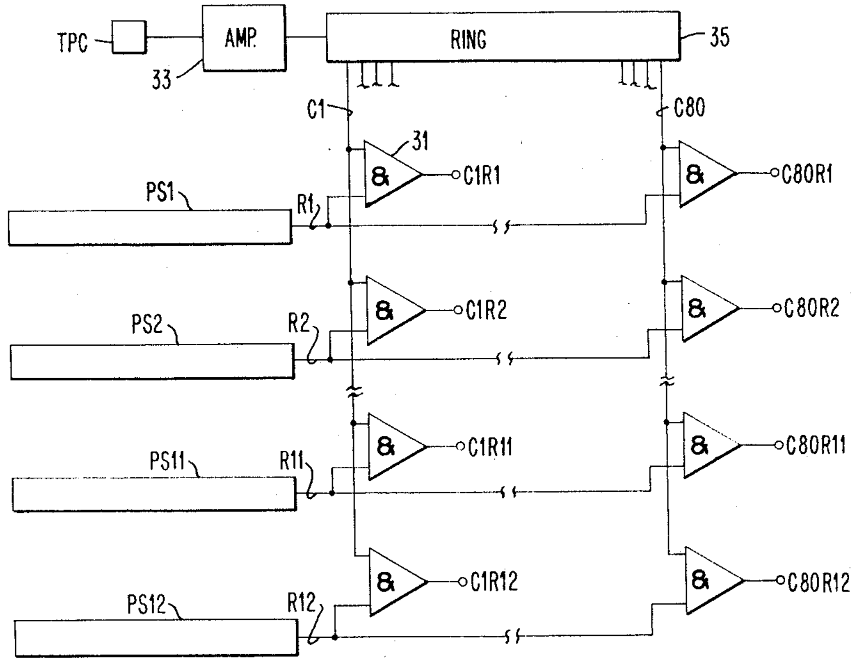
FIG. 4 is a diagrammatic illustration of one form of readout circuitry which may be provided.

In FIG. 4, there is shown a diagrammatic illustration of one form of output switching circuit which could be utilized with the present invention. As shown, the timing photosensitive device TPC supplies output pulses via an amplifier 33 to the input of a ring circuit 35 which may be constructed in any conventional manner to provide output pulses sequentially on a series of output leads, in this case equivalent to the 80 columns to be read from each card. For the sake of clarity, all of the outputs are not shown, only the ones for the first and last columns being indicated as C1 and C80. Each of the photosensitive strips PS1 through PS12 has its output connected to a row bus such as those indicated by the reference characters R1, R2 . . . R11, R12. Suitable amplifiers may be interposed to amplify the output signals from a photoconductive strip, but it will be apparent that the row output buses R1 through R12 will carry signals indicative of the presence of a punched hole for that particular row, when radiant energy is supplied through the punched hole to the photosensitive strip while the sensing holes in the endless tape are in motion thereunder. The row buses are connected in matrix fashion to each of the column output switching lines C1 through C80, to provide a matrix of output circuits, each including an AND circuit which may be of any suitable type, such as the AND circuit indicated by the reference character 31, in which the presence of a signal on the row bus R1 and on the column signal line C1 simultaneously will cause an output to be supplied to a terminal designated by the reference character C1R1. It will be apparent, that as the column signal lines are sequentially energized from C1 through C80, the output signals from photosensing strips appearing on the row buses R1 through R12 will be sequentially swtiched out to the selected ones of the possible output terminals.

It will be obvious to those skilled in the art that variations in the arrangement shown are possible; for example, rather than using an endless belt or tape, an oscillating shield with holes punched therein could be used for scanning the car as it proceeds past the sensing station. Also, while the invention has been particularly shown and described with reference to holes through the cards, it will be understood by those skilled in the art that a system could be arranged to utilize light reffected from the face of cards whereon information is indicated by printed characters or marks or spots or the like. Accordingly, it is to be understood that the foregoing and other changes in form and details may be made without departing from the spirit and scope of the invention.

What is claimed is:

1. Apparatus for reading record cards comprising, in combination, card feeding means for feeding said record cards in seriatim past a reading station, with the largest dimension of the card perpendicular to the direction of travel of the card;

radiant energy supply means at said reading station for uniformly illuminating said cards as they pass said reading station;

cyclically movable mask means for scanning said card, said mask means having a plurality of apertures therein corresponding to a column of indicia on said record;

a plurality of photosensitive elements, one for each row of indicia located on said record;

said mask means and said photosensitive elements being angularly disposed with respect to the direction of travel of said record cards to compensate for the motion of said cards, said photosensitive means being irradiated by radiant energy supplied from said supply means when correspondence occurs between an indicium on said record and one of the apertures in said mask means; and distributor means for determining the location of said apertures wtih respect to the columnar locations of indicia on said record cards.

2. The invention according to claim 1 in which the indicia consists of holes punched at selected locations in said record card.

3. The invention according to claim 1 in which the radiant energy applied is in the optical portion of the spectrum.

4. The invention according to claim 1 in which the photosensitive elements comprise a plurality of continuous adjacent and parallel strips of photoresponsive material.

5. The incention according to claim 1 in which the distributor means comprises a plurality of timing apertures in said movable mask means and a photosensitive element associated therewith to produce a series of timing impulses in synchronism with the motion of said scanning apertures.

6. The invention according to claim 1 in which said movable mask means comprises an endless belt and drive means for said belt synchronized with said card feeding means.

References Cited by the Examiner

UNITED STATES PATENTS

| | | | |
|---|---|---|---|
| 3,065,356 | 11/1962 | Blake et al. ---------- | 250—219 |
| 3,225,176 | 12/1965 | Jones -------------- | 235—61.7 |

References Cited by the Applicant

UNITED STATES PATENTS

| | | |
|---|---|---|
| 2,983,444 | 5/1961 | Martin et al. |
| 3,052,405 | 9/1962 | Woodland. |

MAYNARD R. WILBUR, *Primary Examiner.*

AL NEWMAN, *Assistant Examiner.*